United States Patent [19]

Shuck et al.

[11] 4,191,479
[45] Mar. 4, 1980

[54] SLUDGE AGITATING APPARATUS

[75] Inventors: William D. Shuck, Indianapolis; Frederick D. Lind, Whiteland; John W. Cole, Indianapolis, all of Ind.

[73] Assignee: Tousley-Bixler Construction Co. Inc., Indianapolis, Ind.

[21] Appl. No.: 921,257

[22] Filed: Jul. 3, 1978

[51] Int. Cl.² ............................................. B01F 15/00
[52] U.S. Cl. ..................................... 366/101; 114/264
[58] Field of Search ................ 366/261, 101; 114/264, 114/265, 266; 115/49, 52; 210/271

[56] References Cited

U.S. PATENT DOCUMENTS

| | | | |
|---|---|---|---|
| 1,982,715 | 12/1934 | Whiteside | 366/261 |
| 3,856,272 | 12/1974 | Ravitts | 366/261 X |
| 4,041,640 | 8/1977 | Itanami et al. | 366/361 X |

Primary Examiner—Leonard D. Christian
Attorney, Agent, or Firm—Woodard, Weikart, Emhardt & Naughton

[57] ABSTRACT

A sludge agitating apparatus includes a support platform attached to pontoons for floating on a body of water, such as a waste water treatment facility lagoon, a paddle wheel, and a paddle wheel drive train for moving the platform across the surface of the water, an air distribution pipe, including a plurality of air outlets, movable in a vertical direction into and out of the lagoon, and an air compressor positioned atop the support platform and having an air outlet hose coupled to the air distribution pipe. The air distribution pipe is attached to the ends of two slide members which are attached to one end of the support platform. Initially, with the air distribution pipe positioned slightly below the top layer of sludge, as pressurized air is delivered to the air distribution pipe, the surrounding sludge is agitated and mixed with the surface water. Gradually, as the sludge is agitated, the air distribution pipe is lowered deeper and deeper into the sludge, continuing to agitate and mix the lower levels of gelled sludge with the thinned, agitated mixture of sludge and water positioned thereabove. While this agitating and mixing is occurring, the sludge agitating apparatus moves back and forth over the surface of the lagoon in a radiating pattern around a sludge pumping station. As the sludge agitating apparatus moves toward the pumping station, thinned, pumpable sludge is drawn toward the pumping station and pumped from the lagoon.

28 Claims, 11 Drawing Figures

SLUDGE AGITATING APPARATUS

BACKGROUND OF THE INVENTION

This invention relates in general to methods and apparatus for aerating bodies of water and in particular, to methods and apparatus for agitating sludge.

There are various methods and apparatus which are intended for mixing, influencing and aerating bodies of water (or other liquids) such as lagoons, sludge basins, ponds and reservoirs. Often the apparatus are designed so as to float on the surface of the body of water and, in certain instances, the apparatus may be intended as a means of purification of waste water.

The following list of patents disclose various designs and features of such aerating apparatus:

| Patent No. | Patentee | Issue Date |
| --- | --- | --- |
| 3,709,470 | Auler et al. | 1/09/73 |
| 3,653,641 | Eron | 4/04/72 |
| 3,548,770 | Boutros | 12/22/70 |
| 3,320,160 | Welles, Jr. et al. | 5/16/67 |
| 3,589,997 | Grutsch et al. | 6/29/71 |
| 3,794,303 | Hirshon | 2/26/74 |

Auler et al. discloses a floating apparatus for aeration which includes floating means for supporting the apparatus while not significantly reducing the efficiency of the surface flow created by the apparatus.

Eron discloses a floating liquid aerator and water treatment device adapted for use in aerating and the chemical treatment of polluted water. Surface water is introduced into the device and is radially sprayed creating droplets which increase aeration. The aerated water is returned to the bottom of the body of water by means of hydrostatic water pressure.

Boutros discloses an aerator platform having a plurality of pontoons which are angularly adjustable. There is no disclosure within this patent pertaining to the type or style of aerating device which is to be employed with the aerator platform.

Welles, Jr. et al. discloses a method and apparatus for aerating a large body of water using a relatively small number of floating aeration units. Rather than employ stationary aerating units, the disclosed invention provides cable and pulley means to move the aeration unit reciprocally across the length of the particular body of water. Although different styles of aeration units may be employed with this cable and pulley arrangement, the aeration units which are disclosed are conventional and are intended primarily for water or other low viscosity fluids by the nature of their design.

Grutsch et al. discloses a method for purifying waste water wherein a plurality of lagoons are employed for various treatment stages and an aerating apparatus moves across the surface of each lagoon. The aerating apparatus may be, for example, a paddle wheel type of device which aerates the lower strata of the lagoons and keeps the sludge stirred up and keeps the sludge in a state of suspension with the water. The blades of the paddle wheel design shown in Grutsch et al. are of such a length so as to extend only a short distance below the surface of the water and the sludge deposit depth comprises an extremely minor proportion of the overall lagoon depth.

Hirshon discloses a method and apparatus for aerating bodies of water wherein water is introduced into the aerator by an inlet duct. At the open end of the inlet duct is a bubble tube which receives air under pressure from a suitable source and bubbles this air into the water. These air bubbles both aerate water and raise it above its normal level, thereby providing a sufficient head to force the aerated water out through a return duct. Although the entire apparatus is supported by floats, its movement across the body of water is restricted by being tied to a buoy and the inlet duct is of a fixed length and wound not be able to accommodate different lagoon depths.

Although each of these various apparatus may in fact, in selected instances, be of value to solve a particular problem or effect a desired result, they each have certain disadvantages and shortcomings relative to the following objective.

Waste water treatment facilities typically use lagoons in which sludge deposits collect. Eventually, these lagoons become filled with the sludge and the sludge must be pumped out and transferred to a more distant site so that the lagoon which is adjacent the treatment facility can continue to be used. Sludge deposits in such waste water treatment facility lagoons may accumulate to a depth of fifteen or sixteen feet and often this leaves only three to four feet of water on the surface above the sludge. The solid content of the sludge which is below this surface water increases proportionately with depth. Although the sludge which is adjacent the surface water may only have a solids content of from 6% to 8%, the sludge at the bottom of the lagoon may have a solids content of as high as 20%. In order to be pumpable, it is generally recognized that the solids content should be something less than 20% and it is felt that a preferable maximum value is between 16% and 18%. Of course, additional water could be added to the sludge in order to reduce the percent of solids content, but this procedure would increase the total volume and weight of what must be pumped out of the lagoon and would only tend to increase and compound the task that lies ahead. Furthermore, the various solids which comprise such sludge deposits are often thixotropic in nature and may coagulate into a single gelled mass, if not frequently stirred or agitated. Consequently, unless the sludge-filled lagoon has been frequently agitated during the accumulation of the sludge deposit, conventional aerating and agitating devices are not able to disrupt the gelled mass of sludge in order to stir and agitate the sludge. Such agitation is necessary in order to mix the surface water with the sludge so that the resulting mixture will be thinned to a degree such that its viscosity will be low enough to be pumpable by conventional fluid pumps. Aerating and agitating devices which intake water are unable to handle the gelled mass of sludge, and those devices which generate a stream of air are only effective in the localized area where the outlet nozzles are located. Inasmuch as this localized area may only be several inches in diameter, it is necessary to be able to move the outlet nozzles vertically throughout the gelled mass of sludge and to move from one position to another across the lagoon as localized areas are aerated and mixed. None of the disclosed devices satisfy these various requirements.

SUMMARY OF THE INVENTION

A sludge agitating apparatus for mixing bottom sludge, such as in a waste water treatment lagoon, with surface water in order to thin the sludge so that it can be pumped from the lagoon according to one embodiment of the present invention comprises a support platform having means for floating on a body of water, an agitator mechanism comprising fluid dispensing means and being movably attached to the support platform and movable in a vertical direction between a raised position and a submerged position, and a fluid supply source coupled to the agitator mechanism. The fluid dispensing means includes a plurality of fluid outlets for release of fluid received by the agitator mechanism from the fluid supply source. Additional outlets are used for steering of the apparatus. The method involves discharging jets of air downward into the lagoon, at points proceeding downward just below the surface. The procedure is followed repeatedly as the apparatus is moved across the lagoon in a pattern radiating from a pumping station.

One object of the present invention is to provide an improved sludge agitating apparatus.

Another object of the present invention is to provide an improved method of agitating sludge in a waste water treatment lagoon.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
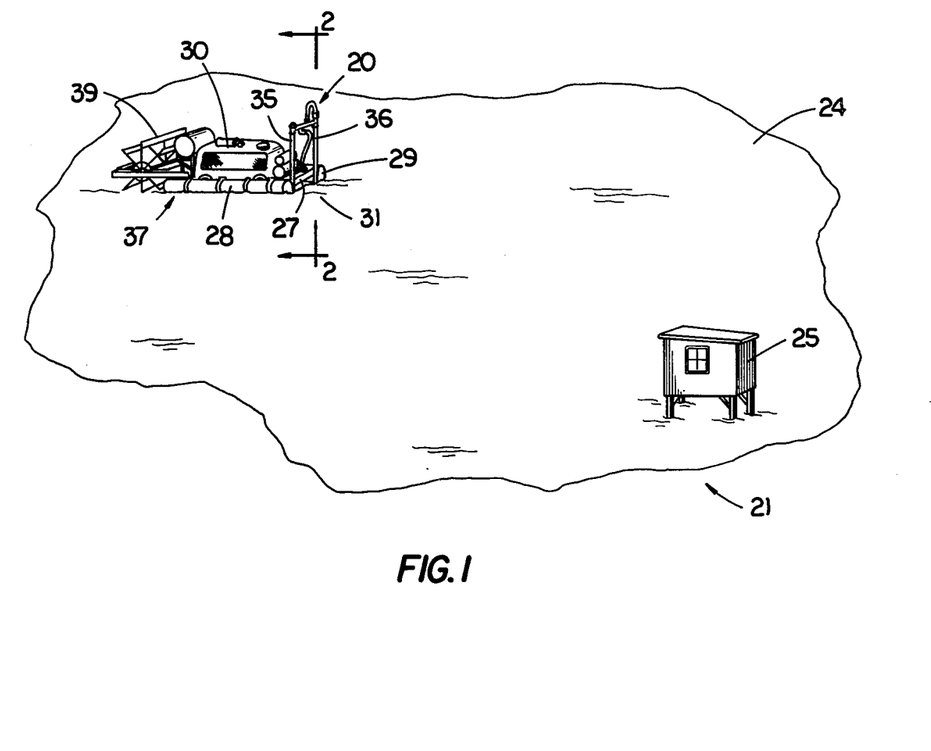
FIG. 1 is a perspective view of a sludge agitating apparatus floating on a waste water treatment lagoon according to a typical embodiment of the present invention.
Figure 2:
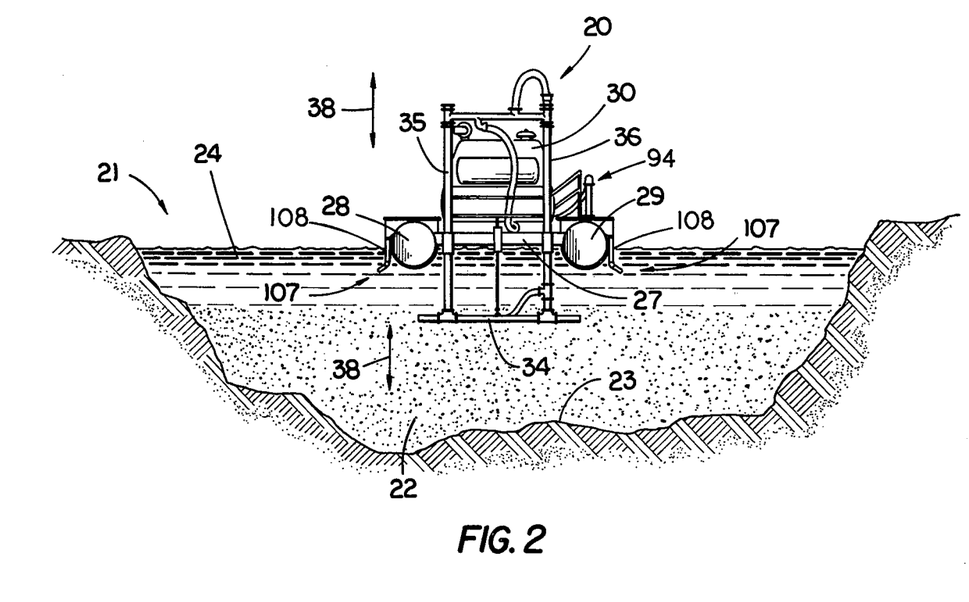
FIG. 2 is a section view of the FIG. 1 lagoon taken along line 2—2 in FIG. 1 and showing also the submerged air distribution pipe portion of the FIG. 1 agitating apparatus.

Referring to FIG. 1, sludge agitating apparatus 20 is oriented as it would be when employed on a body of water (or other fluid), such as, for example, a lagoon of a waste water treatment facility. With continued use and the dumping of waste water into the lagoon 21 (see FIG. 2), sludge 22 will accumulate on the bottom 23 of lagoon 21 and will, in time, reach a level of near capacity of the lagoon and may be fifteen to sixteen feet deep, depending upon the overall depth of the lagoon. The result is that only a shallow blanket of water 24 will be left on top of the sludge deposit. The sludge contains a certain percentage of solids which are mixed with water and the percentage of solids proportionately increases with depth toward the bottom of the lagoon ranging from between 6% and 8% at the top, adjacent the blanket of water 24, to as high as 20% at the bottom of the lagoon. It is generally recognized that in order to be pumpable, the solids content of the sludge must be less than 20% and preferably between 16% and 18% as an upper limit. A further condition of the sludge is that it is thixotropic in nature, and being such, the sludge will gel into substantially a single mass unless it is frequently stirred or agitated. Pumping of the sludge out of the lagoon and transferring the pumped sludge to a distant location may be required when the amount of accumulated sludge in the lagoon has reached the capacity of the lagoon. Typically, at one end or corner of the lagoon, a pumping tower 25 is constructed, toward which thinned sludge is drawn by a suitable skimming technique. Although the blanket of water 24 is able to serve as a vehicle for the thinning of the sludge by reducing the percent of solids content within the sludge, in order to be able to effect a suitable mixing of this water with the sludge, the gelled mass of sludge must be broken up. Sludge agitating apparatus 20 accomplishes this function by agitating the sludge, as will be described in greater detail hereinafter. By breaking up the gelled mass of sludge and permitting the sludge to mix with the blanket of water 24, as part of the sludge agitating operation, the solids content of the sludge is reduced to a level below 20%. This less viscous, thinned sludge and water mixture (the particles of sludge being in a suspended state with the water) is then able to be pumped from the lagoon by conventional fluid pumping techniques and equipment. For example, a lagoon containing a 4-foot blanket of water and 16 feet of sludge ranging from 6% to 20% solids content, when thoroughly mixed together, will result in a mixture having approximately a 4% solids content for the top two feet, an 8% solids content for the next 10 feet and a 16% solids content for the bottom 8 feet. Such a mixture is pumpable by conventional pumping equipment.

Sludge agitating apparatus 20 includes a support platform 27 which is constructed of widthwise I-beams 27a (see FIG. 3) and lengthwise I-beams 27b which are welded together and may be covered in part with metal plates. The outermost ends 27c of I-beams 27a are welded to and between pontoons 28 and 29 and I-beams 27b serve as intermediate bracing members. Positioned atop support platform 27 is an air compressor 30 which serves as a source of pressurized air for various functions which will be described hereinafter. Adjacent the forward end 31 of apparatus 20 is an air distribution pipe 34 which is attached to the ends of two tubular slide members 35 and 36 which are movable in a vertical direction relative to platform 27, as indicated by arrows 38. At the aft end 37 of apparatus 20 is a motor and chain-driven paddle wheel 39 which supplies forward and reverse drive power in order for apparatus 20 to be moved back and forth across the surface of lagoon 21. Although not specifically illustrated, it is to be understood that a variety of cable and pulley combinations could be used to pull apparatus 20 back and forth across the surface of the lagoon in the absence of paddle wheel 39 and its corresponding drive train.

Figure 3:
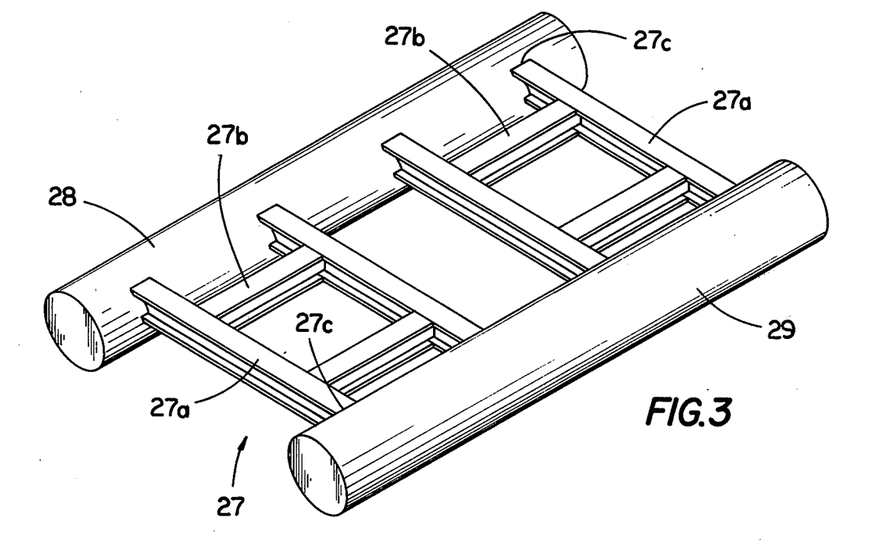
FIG. 3 is a perspective view of part of a support platform comprising a portion of the FIG. 1 agitating apparatus.
Figures 4, 5:
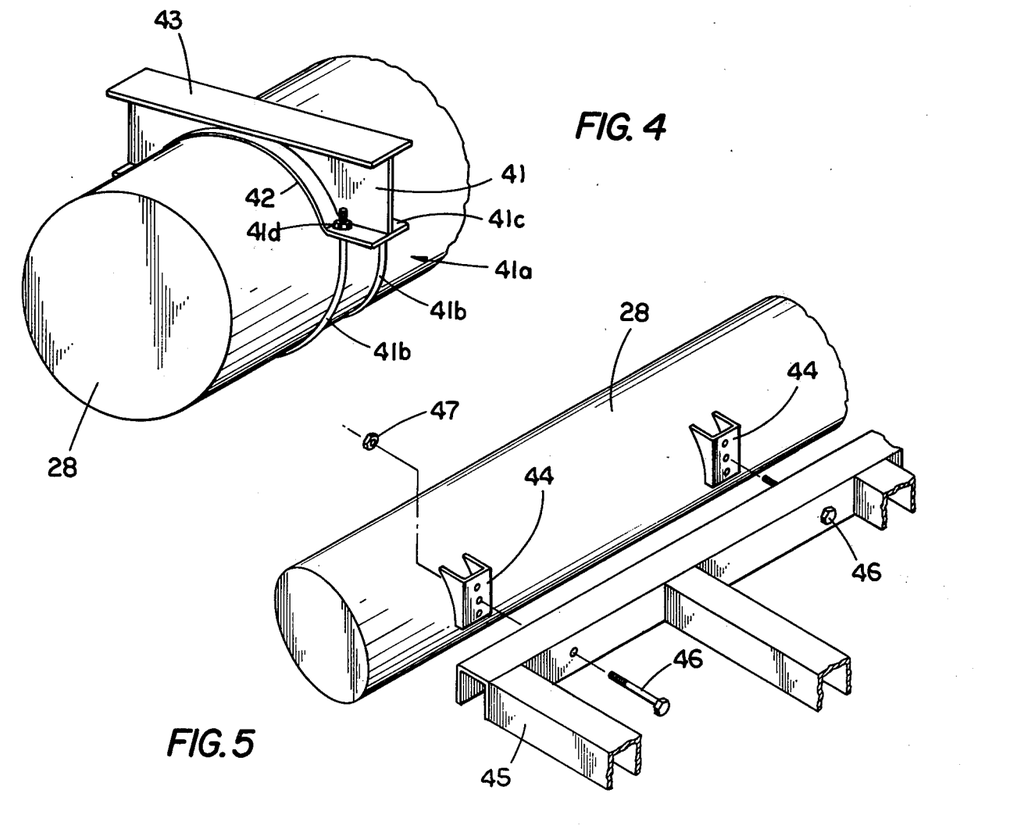
FIG. 4 is a perspective view of a support saddle comprising a portion of the FIG. 1 agitating apparatus.
FIG. 5 is a fragmentary perspective view of an alternate support platform arrangement according to the present invention.

Referring to FIGS. 3, 4 and 5, various structural arrangements of platform 27 and pontoons 28 and 29 are described in detail. Each pontoon 28 and 29 is constructed of heavy gauge metal, such as steel, which has been welded into a cylindrical shape of approximately 25 feet in length and 4 feet in diameter. The ends are closed by means of steel end plates which are welded in place, thereby making each pontoon water-tight. Suitable pontoons can be fabricated from appropriately sized fuel tanks due to the construction and durability of such tanks. Attached to each pontoon at four locations, approximately evenly spaced between the ends of the pontoon, can be support saddles 41 (see FIG. 4) which have a part circular inner edge 42 resting against the corresponding pontoon 28 or 29, and a substantially flat upper edge 43.

Each saddle 41 is rigidly clamped to its corresponding pontoon by means of a double band strap anchor 41a which consists of solid steel bar stock cut into two strands 41b, threaded on each end and wrapped underneath the corresponding pontoon. Each saddle 41 is arranged so as to provide a flange 41c into which each threaded strand may be inserted and drawn tight by means of hex nuts 41d. Each saddle 41 may be used to provide a member to which I-beams 27a may be welded rather than welding directly to the pontoons as in FIG. 3. By welding the I-beams to these various saddles 41 or to other members which may interconnect the I-beams and saddles, the rigidity and stability of the pontoon and platform arrangement is enhanced.

In lieu of fabricating the pontoon, saddle and platform arrangement piece by piece, as a single fabrication activity, which may be awkward due to the sizes and shapes involved, it is possible to fabricate major parts separately. By first welding brackets to the inwardly facing surface of each pontoon and welding together the I-beam frame separately, the structural foundation for apparatus 20 can be completed by merely lowering the frame between the pontoons and bolting the frame to the welded-on brackets. FIG. 5 is a partial view of such a construction wherein brackets 44 are first welded to the inwardly facing surfaces of the pontoons and then frame 45 is lowered adjacent thereto. Bolts 46 are inserted through both members and are secured by nuts 47. Although only shown as a partial view, it should be understood that a suitable number of brackets 44 would be three on each pontoon. In this arrangement as well as in the I-beam and pontoon arrangement of FIG. 3 or FIG. 4, metal plates or grids may be positioned on the top surfaces of the I-beams in order to provide a solid surface on which personnel using apparatus 20 may walk so as to maneuver about the various equipment comprising a portion of the apparatus 20. The decision as to where and how such metal plates should be arranged prior to being welded or bolted into position is dependent upon the size and location of this other equipment which is associated with the particular use of apparatus 20.

Figure 6:
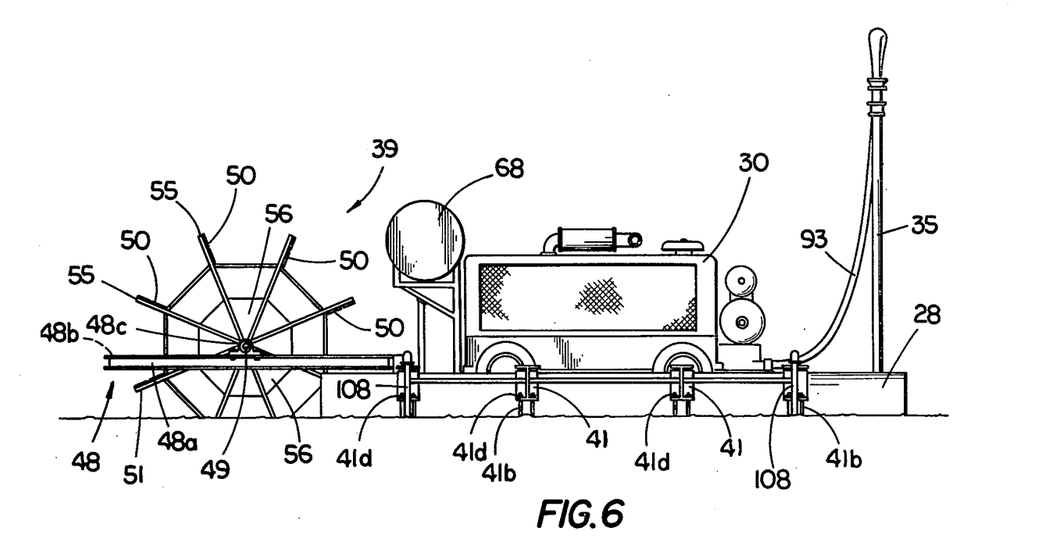
FIG. 6 is a side view of the FIG. 1 agitating apparatus.

In the illustrated embodiment (see FIGS. 6 and 7), the air compressor 30 is positioned directly onto the I-beam frame in the approximate center of apparatus 20. Directly behind compressor 30 are additional I-beams which are welded into two rearwardly extending L-shaped members 48a and comprise a portion of paddle wheel support frame 48. Rearwardly extending members 48a have a connecting cross member 48b and oppositely disposed, in line pillow blocks 48c intermediate the length of members 48a. Paddle wheel 39 includes a center axle 49, which is supported and rotates within pillow blocks 48c, and a series of eight paddles 50 attached to axle 49 and radially extending therefrom in a substantially evenly spaced apart angular relationship. Each paddle comprises three spaced steel bars 51 and wooden board members 52 extending thereacross adjacent the outer ends 55 of each bar 51. Generally triangular steel end plates 56 are welded between the outermost bars 51 on each side of paddle wheel 39 adjacent the ends of axle 49. Paddle wheel 39 is approximately 6 feet in diameter and 5 feet in length. Rigidly attached to end 57 of axle 49 is a sprocket 58 which is chain-driven by reducer sprocket 59 which in turn is chain driven by means of hydraulic motor 62 in combination with sprockets 63 and 64 and suitable lengths 65 and 66 of roller chain. Idler sprocket 67 maintains proper chain tension. Fluid for hydraulic motor 62 is provided by a hydraulic pump 60 which is driven by gasoline engine 61. A suitable hydraulic motor for this application is a model MFB20FUY30 offered by Vickers Hydraulic of Troy, Mich. A suitable hydraulic pump is a model CJ2 offered by Rogers Hydraulic of Racine, Wisconsin. A suitable gasoline engine is a model THD offered by Wisconsin Engine of Milwaukee, Wis. A large capacity fuel tank 68 for engine 61 may be located on the surface of platform 27 or on an elevated structure attached to platform 27 between paddlewheel 39 and air compressor 30 as is illustrated (FIG. 6).

Figure 7:
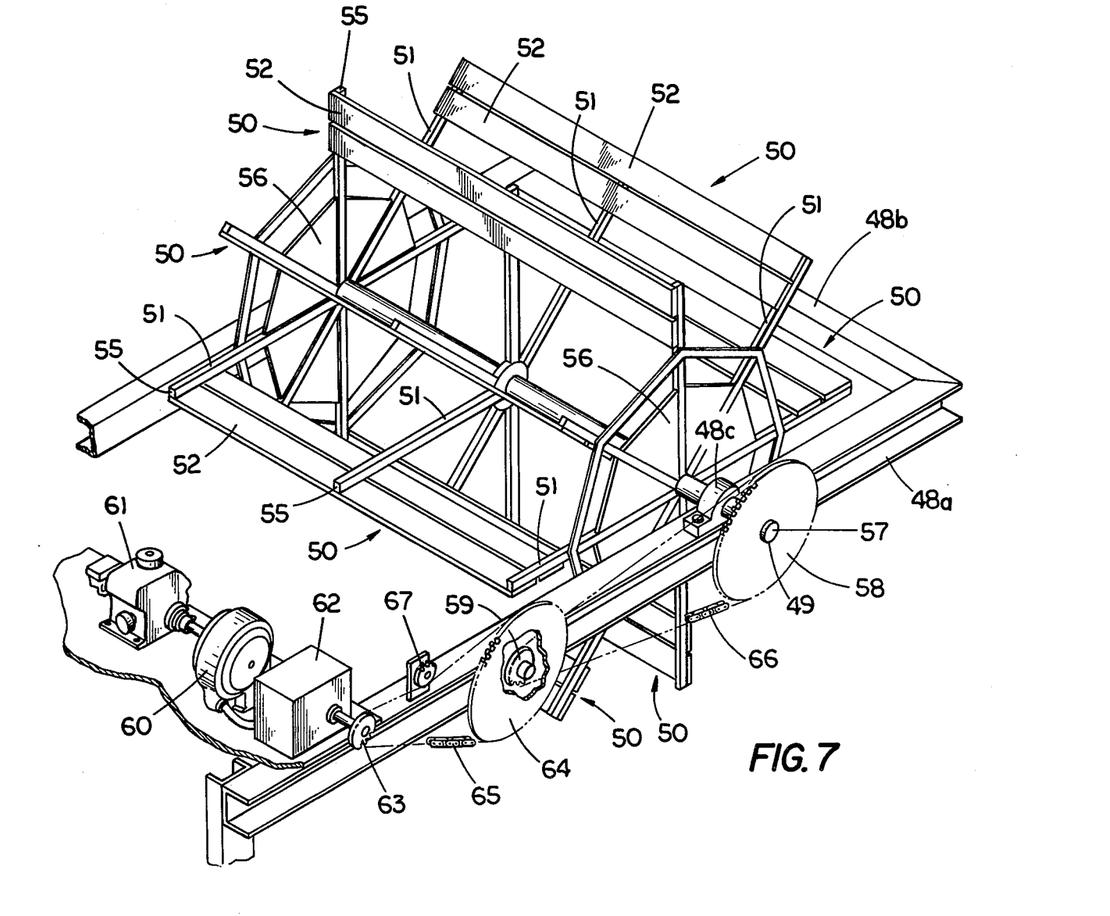
FIG. 7 is a perspective view of a paddle wheel and drive train comprising a portion of the FIG. 1 agitating apparatus.

The speed of the output shaft of motor 62 is approximately 320 RPM and by means of sprockets 63, 64, 59 and 58, this speed is reduced to approximately 8 RPM at the paddle wheel. The position and size of each wooden board member 52 on each paddle 50 is such that with apparatus 20 loaded with the necessary equipment and in use on lagoon 21, the submerged depth of each paddle as it turns through its lowest point relative to axle 49, is slightly below the top surface of the blanket of water 24. The paddle wheel may be driven in either a clockwise or counterclockwise direction for forward and reverse movement of apparatus 20 across lagoon 21.

Figure 8:
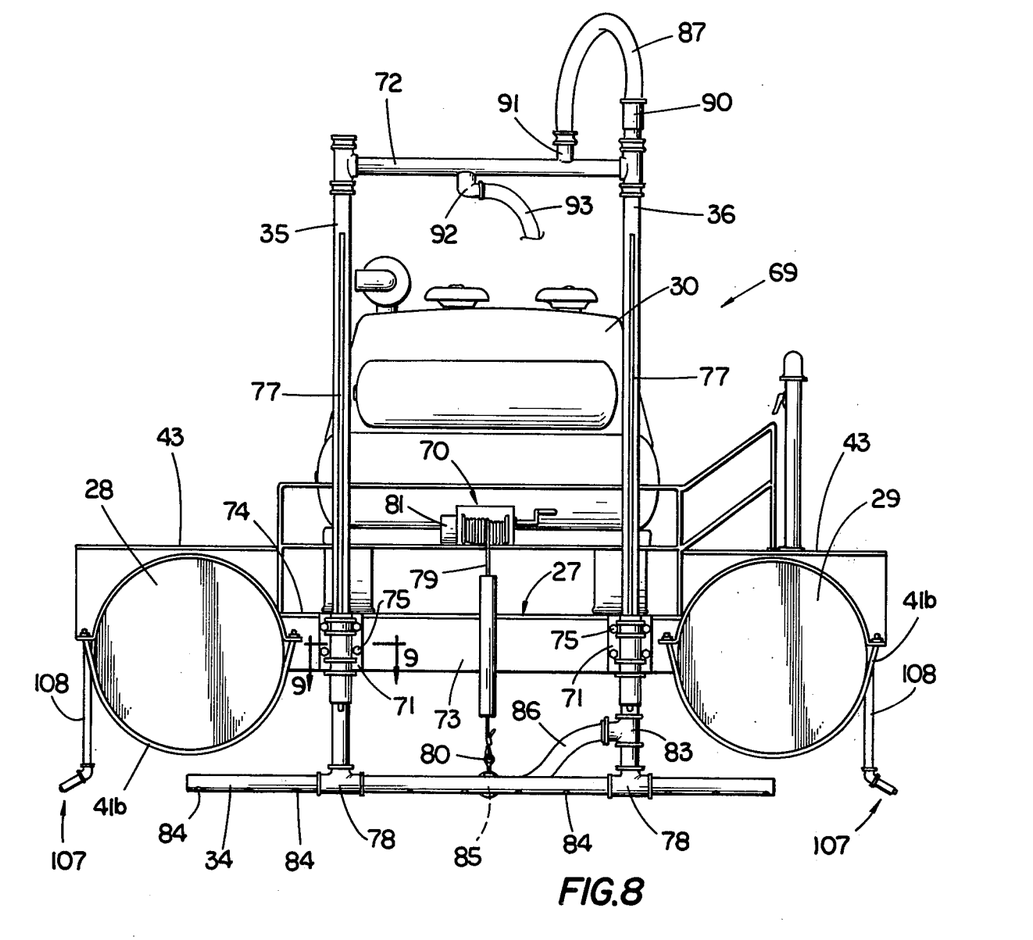
FIG. 8 is a front view of the FIG. 1 agitating apparatus.
Figure 9:
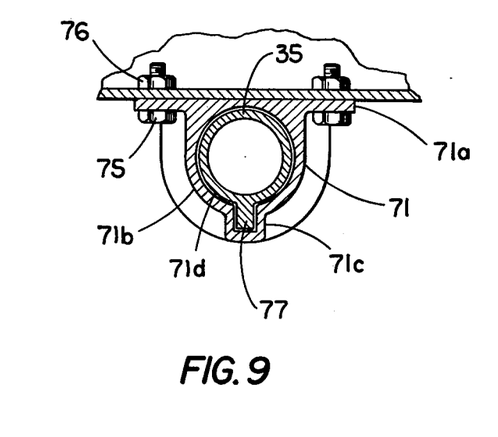
FIG. 9 is a section view of a slide member and guide taken along line 9—9 in FIG. 8 and comprising a portion of the FIG. 1 agitating apparatus.

Positioned adjacent forward end 31 of apparatus 20 is an agitator mechanism 69 (see FIG. 8) which includes air distribution pipe 34, tubular slide members 35 and 36, which 70, guides 71 and cross member 72. The frontmost end of platform 27 has a support flange 73 (which may be an I-beam or angle iron) which has been welded to the forwardmost one of I-beams 27a and extends downwardly below cover plate 74 for a length of from 6 to 8 inches. There are two guides 71 which are attached to flange 73 (one for each tubular slide member) by means of threaded fasteners such as bolts 75 and nuts 76. As illustrated in FIGS. 8 and 9, each guide 71 has a substantially flat flange member 71a integral therewith and a tubular portion 71b with a generally circular cross-sectional shape. Opposite flange member 71a is a protruding tab 71c which is internally hollow and opens into cylindrical aperture 71d of tubular portion 71b. Each tubular slide member 35 and 36 has an alignment protuberance 77 centrally positioned and welded to the tubular body of its corresponding slide member. This protuberance or key extends virtually the entire length of its corresponding slide member and is sized so as to fit closely within the hollow keyway portion of protruding tab 71c. In this manner, each guide 71 is able to retain its corresponding slide member and to permit sliding movement in a vertical direction. Regardless of the unevenness of the load which may be placed on air distribution pipe 34 by the sludge as apparatus 20 is moved through the lagoon, the interlocking arrangement of protuberances 77 and tabs 71c prevent any turning or twisting of slide members 35 and 36 and of pipe 34.

Each slide member is joined to air distribution pipe 34 by means of a T-fitting 78 which may either be an integral part of air distribution pipe 34 or may be attached thereto as a separate clamping piece. The entire agitator mechanism may be moved in a vertical direction by means of winch 70 and wire rope 79 which is wound on the spool of the winch and is attached to eyebolt 80 which is secured to air distribution pipe 34 in its approximate lengthwise center. With winch 70 disengaged so that the spool and wire rope can unwind, gravity will cause air distribution pipe 34 to lower into the sludge of the lagoon under most conditions. However, if the sludge is extremely thick, the lowering of air distribution pipe 34 may need to be manually aided by pushing downwardly on the two slide members. At the desired depth, winch 70 is engaged and the downward descent is halted. This procedure is repeated for positioning at greater depths in the lagoon until the entire depth of the lagoon in the area of the air distribution pipe 34 has been agitated. Then, winch 70 is engaged and pipe 34 is raised and apparatus 20 moves to another location. It is also possible to move apparatus 20 across the surface of the lagoon as this raising and lowering is being performed. The precise sequence of movements being somewhat arbitrary with the operator although affected by the particular conditions, such as sludge depth and viscosity. Winch 70 may be either controlled by a battery-powered electric driven motor 81 or air-powered winch or manually operable by a crank and ratchet arrangement. Although the overall length of each slide member 35 and 36 is approximately 20 feet, the extent of travel is limited to approximately 17 feet due to the structural restrictions at each end of the slide members. In a fully raised position, air distribution pipe 34 will be slightly below the lowermost point of pontoons 28 and 29 and, in a fully submerged position, pipe 34 will typically be adjacent the bottom surface of the lagoon.

Air distribution pipe 34, which is approximately 10 feet in length and four inches in diameter, includes a substantially evenly spaced series of 18 air outlets 84 which are positioned along the downwardly facing surface of air distribution pipe. There are nine such outlets on each side of eyebolt 80. When pressurized air is introduced into air distribution pipe 34, each air outlet 84 creates a high velocity stream of air in a downward direction which coincides with the direction of movement of pipe 34 into the sludge. Each high-velocity stream of air is able to disrupt and agitate an area of sludge approximately 2 feet in diameter. As these streams of air strike gelled masses of sludge, the pressure of the streams, as well as their action of penetrating these masses, breaks up such masses into smaller portions. Similarly, these smaller portions of sludge continue to be struck by the streams of air and are also propelled into other parts of the gelled masses. The ends of the air distribution pipe 34 are sealed closed and an aperture fitting 85 opens into pipe 34 in an approximate centered location adjacent eyebolt 80. A length of flexible, high-pressure air hose 86 is connected between fitting 83 and 85, and air delivery outlet fitting 83 opens into the hollow center of slide member 36 in an air-tight arrangement. At the top end of tubular slide member 36, a further length 87 of flexible high-pressure air hose is connected in an air-tight manner between end 90 and a branch pipe 91 which is joined with cross member pipe 72. A relatively long flexible, high-pressure air hose 93 is coupled to pipe 72 at elbow 92. This air hose 93 connects to one outlet of an air supply manifold 94 (see FIG. 10) which is supplied pressurized air from air compressor 30. The air supplied from air compressor 30 is at approximately 90 psi and 825 cfm. Although the cross member 72 is shown as rigidly connected to tubular slide members 35 and 36, cross member 72 is closed off at each end beyond pipe 91 and pipe 92 so that the pressurized air entering pipe 72 from hose 93 will follow a path through pipe 72 only between pipes 92 and 91, and then through hose 87, through slide member 36, through hose 86 and out through the air outlets 84 of air distribution pipe 34.

Figure 10:
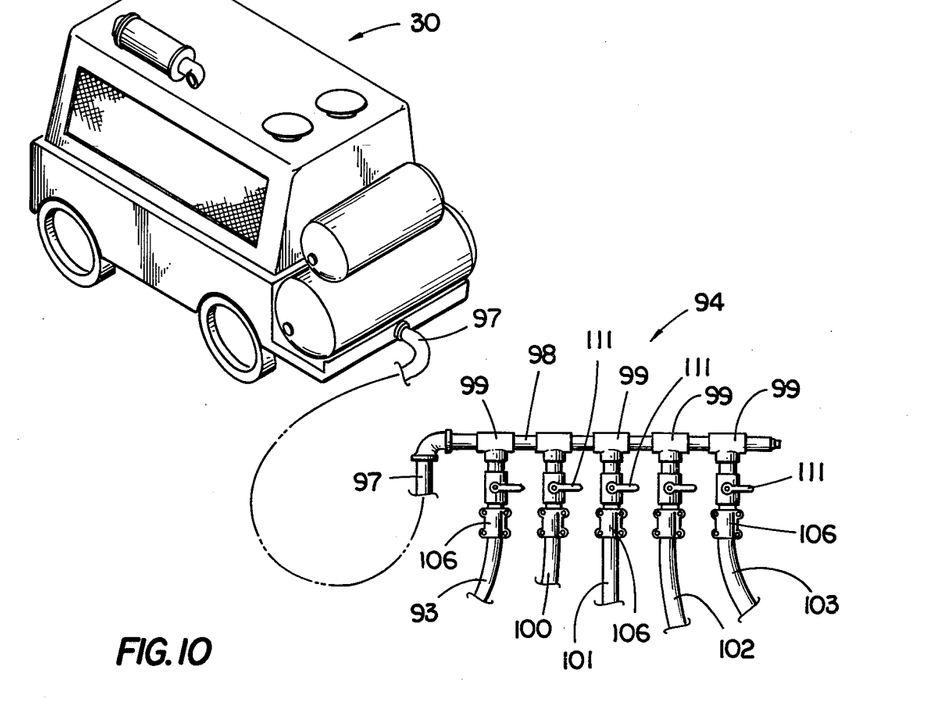
FIG. 10 is a perspective view of an air compressor, air manifold and hose arrangement comprising a portion of the FIG. 1 agitating apparatus.
Figure 11:
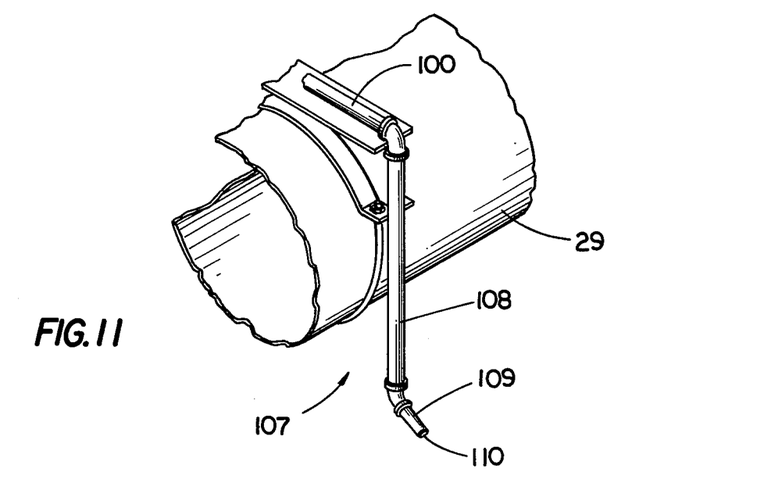
FIG. 11 is a perspective view of a hose and nozzle arrangement comprising a portion of the FIG. 1 agitating apparatus.

A further feature of agitating apparatus 20 is the unique steering mechanism described hereinafter. Air compressor 30 has its main pressurized air output line 97 connected to air supply manifold 94 which includes center tube 98 and a series of five T-couplings 99 connected thereto. The air delivered to air supply manifold 94 is distributable to the five hoses 93, 100, 101, 102 and 103, each of which is clamped to its corresponding T-coupling 99 by means of a two-part flanged bracket 106. As previously mentioned, hose 93 connects to the agitator mechanism while the remaining four hoses each connect to a different air nozzle 107 (FIGS. 8 and 11). There are a total of four nozzles 107, two on each side of platform 27, each of which are secured immediately outboard the outwardly facing surface of the corresponding pontoon in a four-corners type of arrangement. Each nozzle 107 (see FIG. 11) includes a section of pipe 108 at a top end which joins to a corresponding air hose of the group of hoses 100-103 and a tapered nozzle outlet 109 at the bottom end which forms an approximate 135° angle with pipe 108 in a downward and outward direction relative to the side of the corresponding pontoon. The axis of each outlet 109 is disposed in a plane which is substantially perpendicular to the cylindrical axis of the corresponding pontoon. The end opening 110 of nozzle outlet 109 is approximately 0.75 inches in inside diameter and is positioned approximately 1 foot below the plane which includes the lowermost surfaces of pontoons 28 and 29. Steering is performed by means of air valves 111 which control the air flow to these various nozzles. The four nozzles 107 are positioned adjacent to the ends of each pontoon and these locations correspond to the four corners of platform 27 such that when the operator of apparatus 20 wishes to turn left, the air valves which control the front right and left rear nozzles are opened, with the other two valves being closed. Similarly, when the operator is facing forward and a right turn is desired, air is delivered to the front left and right rear nozzles with the air flow to the other nozzles being turned off by means of their corresponding valves 111. Although a rudder could be used, the use of the air nozzles for steering is easier than a rudder and these nozzles also aid in the continued agitation and stirring of the water and sludge mixture after the sludge has been broken free from its gelled mass by means of the high velocity streams of air from air distribution pipe 34.

When apparatus 20 is used to agitate a shallow accumulation of sludge, such as 1 to 2 feet in overall depth, then agitator mechanism 69 may be lowered to a point adjacent the top surface of the sludge accumulation and the force of the air stream out of the air outlets 84 is sufficient to thoroughly mix the sludge accumulation with the surface water. This mixing is not a homogenizing step, and after pumping the sludge and water mixture from the lagoon and delivery to another location, the sludge will once again settle to the bottom of the lagoon or reservoir in which the mixture is placed at the new location and the excess water can be pumped off the top.

However, when the sludge accumulation amounts to 15 or 16 feet, the method of use for apparatus 20 is somewhat different from the shallow method just described. For a fifteen to sixteen foot depth of sludge, apparatus 20 is moved back and forth over a particular area of the lagoon with agitator mechanism 69 initially positioned adjacent the top of the sludge accumulation layer. As the streams of air exiting air outlets 84 begin to break up the gelled mass of sludge and start a mixing action with the blanket of water thereabove, agitator mechanism 69 is gradually lowered deeper and deeper into the sludge until all of the sludge is mixed with the blanket of water in the particular localized region where apparatus 20 is being operated. Once in this thinner state, the sludge and water mixture can be removed from the lagoon by conventional pumping equipment and techniques as previously discussed. The rate of descent for agitator mechanism 69 is dependent upon the percent of solids within the sludge accumulation. The operator of apparatus 20 must gauge the resistance which is being encountered by agitator mechanism 69 as evidenced by the tension on wire rope 79 and the deflection of slide members 35 and 36, as the apparatus is moved across the lagoon. If the air distribution pipe 34 is lowered too deep into the sludge, and the resistance becomes excessive, then winch 70 must be used to raise pipe 34 to a level where there will be less load. The rate of descent of pipe 34 as the sludge is broken up, need not be continuous and gradual but may in fact be done in finite steps.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A sludge agitating apparatus for conditioning sludge so that it can be pumped from a lagoon, and comprising:
   a support platform having means for floating on a body of water;
   an agitator mechanism comprising fluid dispensing means;
   means for attaching said agitator mechanism to said support platform, said attaching means arranged for movement of said agitator mechanism between a raised position wherein the fluid dispensing means is adjacent said support platform, and a submerged position substantially below said support platform;
   a fluid supply source coupled to said agitator mechanism; and
   said fluid dispensing means including a plurality of fluid outlets for release of fluid received by said agitator mechanism from said fluid supply source.

2. The sludge agitating apparatus of claim 1 wherein said fluid supply source is an air compressor.

3. The sludge agitating apparatus of claim 2 wherein said floating means includes a pair of pontoons positioned on opposite sides of said support platform.

4. The sludge agitating apparatus of claim 3 in which the agitator mechanism further includes a first slide member, a second slide member substantially parallel to said first slide member and a cross member connected between said first and said second slide members, and said attaching means includes a plurality of guides attached to said support platform and slidably receiving said first and second slide members, and a winch mounted to said support platform and connected to said fluid dispensing means, said fluid dispensing means being attached to said first and said second slide members and movable between said raised position and said submerged position by means of said winch.

5. The sludge agitating apparatus of claim 4 which further includes a single inlet hose and a plurality of outlet hoses and a fluid supply manifold coupling said single inlet hose to said plurality of outlet hoses, one of said plurality of outlet hoses communicating with said cross member, said single inlet hose being connected to said fluid supply source.

6. The sludge agitating apparatus of claim 5 wherein said fluid dispensing means further includes a fluid distribution pipe, said plurality of fluid outlets being disposed along said fluid distribution pipe and opening in a downwardly facing direction.

7. The sludge agitating apparatus of claim 6 which further includes a first flexible hose connected between and communicating with said cross member and said first slide member and a second flexible hose connected between and communicating with said first slide member and said fluid distribution pipe, whereby fluid from said fluid supply source is able to be delivered from said cross member through a portion of the length of said first slide member to said fluid distribution pipe.

8. The sludge agitating apparatus of claim 7 which further includes means for moving said platform across said body of water.

9. The sludge agitating apparatus of claim 8 wherein said moving means includes a paddle wheel.

10. The sludge agitating apparatus of claim 9 wherein said moving means further includes a hydraulic motor mechanically coupled to said paddle wheel.

11. The sludge agitating apparatus of claim 10 wherein said mechanical connection between said hydraulic motor and said paddle wheel includes a plurality of sprockets and a plurality of lengths of roller chain.

12. The sludge agitating apparatus of claim 11 which further includes a plurality of air nozzles positioned adjacent said pontoons and extending to a depth below said pontoons.

13. The sludge agitating apparatus of claim 12 wherein each of said air nozzles is coupled to a different one of said plurality of outlet hoses.

14. The sludge agitating apparatus of claim 13 wherein there is a different air nozzle located adjacent each end of each of said pontoons.

15. The sludge agitating apparatus of claim 14 wherein each air nozzle has a downwardly facing outlet, the axis of each outlet being disposed in a plane which is substantially perpendicular to the cylindrical axis of a corresponding one of said pontoons.

16. The sludge agitating apparatus of claim 15 and further comprising a plurality of valves coupled between said manifold and said hoses, there being one valve associated with each of said air nozzles whereby delivery of air from said air compressor to each of said air nozzles is controlled by a separate valve.

17. The sludge agitating apparatus of claim 16 wherein said paddle wheel and said fluid distribution pipe are at opposite ends of said support platform.

18. The sludge agitating apparatus of claim 17 wherein each pontoon is generally cylindrical, approximately 25 feet in length and 4 feet in outside diameter.

19. The sludge agitating apparatus of claim 18 wherein said paddle wheel includes a central axle and eight paddles radially extending therefrom, said paddle wheel being approximately 6 feet in diameter and 5 feet in length.

20. The sludge agitating apparatus of claim 19 wherein said fluid distribution pipe is approximately 10 feet in length and includes 18 downwardly opening fluid outlets spaced along the length of the pipe.

21. The sludge agitating apparatus of claim 20 wherein the length of travel of said fluid distribution pipe between said raised position and said submerged position is approximately 17 feet.

22. A sludge agitating apparatus for conditioning sludge so that it can be pumped from a lagoon, and comprising:
   a support platform having means for floating on a body of water;
   an agitator mechanism comprising fluid dispensing means;
   means for attaching said agitator mechanism to said support platform, said attaching means arranged for movement of said agitator mechanism between a raised position wherein the fluid dispensing means is adjacent said support platform, and a submerged position substantially below said support platform;
   a fluid supply source coupled to said agitator mechanism; and
   said fluid dispensing means including velocity discharge means disposed at a plurality of longitudinally spaced locations.

23. The sludge agitating apparatus of claim 22 wherein each of said velocity discharge means includes an outlet for release of fluid received from said fluid supply source, each of said outlets opening in a downwardly facing direction.

24. The sludge agitating apparatus of claim 23 wherein said fluid is air.

25. The sludge agitating apparatus of claim 3 which further includes means for air propulsion of said sludge agitating apparatus, said propulsion means including air nozzles positioned adjacent said pontoons and oriented so as to cause movement of said sludge agitating apparatus in response to air being discharged from said nozzles.

26. The sludge agitating apparatus of claim 25 wherein there is at least one of said air nozzles located adjacent each end of each of said pontoons, said ends corresponding to the four corners of said sludge agitating apparatus.

27. The sludge agitating apparatus of claim 26 wherein each air nozzle includes a downwardly facing outlet, the axis of each outlet being disposed in a plane which is substantially perpendicular to the cylindrical axis of a corresponding one of said pontoons.

28. The sludge agitating apparatus of claim 27 wherein said air nozzles are arranged relative to said apparatus such that said apparatus is able to be steered in one direction by controlling the amounts of air discharged by those air nozzles disposed at one pair of diagonally opposite corners of said apparatus and said apparatus is able to be steered in the opposite direction by controlling the amounts of air discharged by those air nozzles disposed at the other pair of diagonally opposite corners of said apparatus.

* * * * *